Patented Sept. 19, 1950

2,522,831

UNITED STATES PATENT OFFICE 2,522,831

ANTIBIOTIC PRODUCTS

David Libermann, Paris, France, assignor to Chimie & Atomistique, Paris, France, a French company No Drawing. Application September 2, 1948, Serial No. 47,539. In France June 29, 1948

8 Claims. (Cl. 167—65)

The research work carried out by the applicant has shown that the known antibacterial activity of antibiotic products such as penicillin, streptomycin, thyrothricin, allicin and the like, can be considerably increased by causing these products to act in the presence of substances of the thiouracil family, which exert a braking effect upon the production of thyroxin and, consequently, decrease the basic metabolism.

The invention has for its object to provide improved antibiotic products which comprise a mixture of antibiotic substances and a thiouracil such as, 6-propyl-thiouracil, 6-benzyl-thiouracil and tetra-methylene-thiouracil.

In the case where the antibiotic substances are administered by intramuscular injection, thiouracils are added in the form of their sodium salts, either dissolved in isotonic sodium chloride solutions, or as a powder added to penicillin or other antibiotic substance.

For example, 0.10 to 0.20 g. of sodium-6-benzyl-thiouracil or sodium tetramethylene thiouracil may be added to 200,000 u. of penicillin.

Having now described my invention what I claim as new and desire to secure by Letters Patent is:

1. An improved antibiotic product comprising a mixture of an antibiotic substance with a member of the thiouracil family.

2. A product as claimed in claim 1 wherein said antithyroidal substance is 6-benzyl-thiouracil.

3. A product as claimed in claim 1 wherein said antithyroidal substance is tetra-methylene-thiouracil.

4. An improved antibiotic substance comprising a mixture of penicillin with 6-benzyl-thiouracil.

5. A product as claimed in claim 1, wherein said thiouracil is added in the form of a sodium salt dissolved in an isotonic sodium chloride solution.

6. An antibiotic product comprising a mixture of penicillin and sodium-6-benzyl-thiouracil in the proportion of 0.10 to 0.20 g. of sodium-6-benzyl-thiouracil to 200,000 units of penicillin, said sodium benzyl-thiouracil being in solution in an isotonic sodium chloride solution.

7. An antibiotic product comprising a mixture of penicillin and sodium tetra-methylene-thiouracil in the proportion of 0.10 to 0.20 g. of sodium tetra-methylene-thiouracil to 200,000 units of penicillin, said sodium tetra-methylene-thiouracil being in solution in an isotonic sodium chloride solution.

8. A product as claimed in claim 1 wherein said thiouracil is 6-propyl-thiouracil.

DAVID LIBERMANN.

REFERENCES CITED

The following references are of record in the file of this patent:

"Thiouracil and Its Allies in the Treatment of Hyperthyroidism," International Abstract of Surgery, Feb. 1948, pages 105 to 123.

"Penicillin, Its Practical Application," Fleming (1946), page 106.